US008867042B2

(12) United States Patent
Kawanishi et al.

(10) Patent No.: US 8,867,042 B2
(45) Date of Patent: Oct. 21, 2014

(54) METHOD FOR EVALUATING CHARACTERISTIC OF OPTICAL MODULATOR HAVING MACH-ZEHNDER INTERFEROMETER

(75) Inventors: Tetsuya Kawanishi, Tokyo (JP); Akito Chiba, Tokyo (JP); Junichiro Ichikawa, Tokyo (JP); Masaaki Sudo, Tokyo (JP)

(73) Assignees: National Institute of Information and Communications Technology, Tokyo (JP); Sumitomo Osaka Cement Co., Ltd., Tokyo (JP)

( * ) Notice: Subject to any disclaimer, the term of this patent is extended or adjusted under 35 U.S.C. 154(b) by 312 days.

(21) Appl. No.: 13/394,382

(22) PCT Filed: Sep. 7, 2009

(86) PCT No.: PCT/JP2009/004406
§ 371 (c)(1),
(2), (4) Date: Mar. 6, 2012

(87) PCT Pub. No.: WO2011/027409
PCT Pub. Date: Mar. 10, 2011

(65) Prior Publication Data
US 2012/0162656 A1    Jun. 28, 2012

(51) Int. Cl.
*G01B 9/02* (2006.01)
*G02F 1/225* (2006.01)
*G02B 6/293* (2006.01)
*G02F 1/21* (2006.01)

(52) U.S. Cl.
CPC ...... *G02B 6/29355* (2013.01); *G02F 2001/212* (2013.01); *G02F 1/225* (2013.01); *G02F 2203/69* (2013.01)

USPC .......................................................... 356/450

(58) Field of Classification Search
CPC . G06F 2001/212; G06F 1/2252; G06F 1/225; G02B 6/29355
USPC ................................................. 356/450–521
See application file for complete search history.

(56) References Cited

U.S. PATENT DOCUMENTS

2002/0196444 A1*  12/2002  Nymen et al. ............... 356/460

FOREIGN PATENT DOCUMENTS

| JP | B2-3538619 | 4/2004 |
| JP | B2-3866082 | 10/2006 |
| WO | WO 2009/110039 | 9/2009 |

OTHER PUBLICATIONS

Tetsuya Kawanaishi et al., Precise Characteristics Measurement of Mach-Zehnder Modulators using Modulated Optical (Certified English translation) Specturm, Oct. 16, 2008, IEICE Technical Report, pp. 53-58.*

(Continued)

*Primary Examiner* — Tarifur Chowdhury
*Assistant Examiner* — Michael P Lapage
(74) *Attorney, Agent, or Firm* — Posz Law Group, PLC

(57) ABSTRACT

A method for evaluating a characteristic of, especially, each of Mach-Zehnder interferometers (MZIs) of an optical modulator. The method includes a step of measuring the intensity of the output of the optical modulator containing MZIs and a step of evaluating a characteristic of each MZI by using the sideband. The output intensity measuring step is the one of measuring the intensity $S_{n,k}$ of the sideband signal contained in the output light from the optical modulator. The characteristic evaluating step is the one of evaluating a characteristic of the $MZI_k$ by using the $S_{n,k}$.

10 Claims, 4 Drawing Sheets

(56) References Cited

OTHER PUBLICATIONS

Tetsuya Kawanishi et al., Direct measurement of chirp parameters of high-speed Mach-Zehnder-type optical modulators, 2001, Optical Communications, 399-404.*

Tetsuya Kawanishi et al., "Measurement of Mach-Zehnder interferometer based modulators by using optical spectrum analysis", IEICE Technical Report, Oct. 16, 2008, vol. 108, No. 261, pp. 53-58 (and English abstract).

International Search Report mailed on Oct. 6, 2009 for the corresponding International patent application No. PCT/JP2009/004406.

* cited by examiner

| $V\pi$ [V] | $V\pi$ [V] | $V\pi$ [V] |
|---|---|---|
| determining by first/second order ratio | determining by third/first order ratio | determining by second/third order ratio |
| 3.729 | | |
| 3.828 | | |
| 3.827 | 2.995 | 2.344 |
| 3.818 | 3.654 | 3.498 |
| 3.806 | 3.804 | 3.803 |
| 3.792 | 3.824 | 3.856 |
| 3.761 | 3.768 | 3.775 |

METHOD FOR EVALUATING CHARACTERISTIC OF OPTICAL MODULATOR HAVING MACH-ZEHNDER INTERFEROMETER

TECHNICAL FIELD

The present invention relates to method for evaluating characteristic of optical modulator having mach-zehnder interferometer (MZI). In particular, the present invention relates to a method for evaluating characteristics of an optical modulator having a plurality of Mach-Zehnder interferometers without using a zero-order component of output consciously.

BACKGROUND ART

An optical modulator is used in many optical information communication systems. Thus, it is useful to understand characteristics of an optical modulator. Parameters specifying performance of an optical modulator include the insertion loss, modulation index, half-wavelength voltage (V$\pi$), optical band, ON/OFF extinction ratio, polarization extinction ratio, and chirp parameter. The method for evaluating characteristics of an optical modulator has been investigated and some evaluation methods have been reported.

Japanese Patent No. 3538619 discloses an invention of determining the modulation index by using a measured power spectrum after measuring the power spectrum of an MZ-type optical modulator having one Mach-Zehnder interferometer (MZI).

Japanese Patent No. 3866082 discloses an invention of determining the half-wavelength voltage and chirp parameter of an optical modulator from a spectral distribution of an MZ-type optical modulator having one MZI.

On the other hand, optical modulators containing a plurality of MZIs have recently been developed. It is desirable to evaluate characteristics of individual MZIs in such an optical modulator. However, individual MZIs in such an optical modulator cannot be evaluated appropriately according to a conventional method for evaluating characteristics of an optical modulator having one MZI.

Patent Literature 1: Japanese Patent No. 3538619
Patent Literature 2: Japanese Patent No. 3866082

SUMMARY OF THE INVENTION

The Problem to be Solved by the Invention

An object of the present invention is to provide a method for evaluating characteristics of an optical modulator having a plurality of MZIs.

Means for Solving the Problems

In an optical modulator, the strength of the zero-order component is normally predominantly strong. Thus, the zero-order component is resistant to noise and the like. Therefore, conventionally, characteristics of an optical modulator have been evaluated by using the zero-order component of output light from an optical modulator. However, if an optical modulator contains a plurality of MZIs, the zero-order component contains components derived from other MZIs than the MZI whose characteristics are evaluated. Therefore, if characteristics of an optical modulator are evaluated by using the zero-order component, characteristics of the MZI to be evaluated cannot be evaluated correctly. According to the present invention, normally, the zero-order component with the highest strength is consciously not used for evaluation of characteristics of an optical modulator. That is, the present invention basically relates to a method for evaluating characteristics of an optical modulator using side bands. Thus, by evaluating characteristics of an optical modulator containing a plurality of MZIs using side bands, characteristics of the MZIs and the optical modulators containing the MZIs can be evaluated with precision.

A first aspect of the present invention relates to a method for evaluating characteristics of an optical modulator containing a plurality of Mach-Zehnder interferometers (MZIs). The optical modulator includes N (N is an integer 2 or more) MZIs connected in parallel. The MZI to be evaluated is the K-th MZI (MZI$_K$) and the strength of the n-th order side band component of MZI$_K$ is S$_{n,k}$. This method contains a process of measuring output strength and a process of evaluating characteristics of the MZI. The process of measuring output strength is a process of determining the strength S$_{n,k}$ of a side band signal contained in output light from the optical modulator. The process of evaluating characteristics is a process of evaluating characteristics of the MZI$_K$ by using S$_{n,k}$.

The preferred embodiment of the first aspect of the present invention further includes a process of suppressing the zero-order component contained in output light from the optical modulator by adjusting a bias voltage applied to the MZIs other than the MZI$_K$ of the plurality of MZIs. Then, the process of measuring output strength is a process of determining a strength (S$_{n,k}$) of a side band signal contained in output light from the optical modulator in which the zero-order component is suppressed.

The preferred embodiment of the first aspect of the present invention further includes a process of calculating whether a difference or a ratio of strengths of the n-th order side band component and the −n-th order side band component of MZI$_K$ is equal to or less than a predetermined threshold, thereby evaluating a skew of the MZI$_K$.

The preferred embodiment of the first aspect of the present invention controls the bias voltage applied to electrodes of the MZI$_K$ to measure the n-th order side band (S$_{n,k}^{(-)}$) of the MZI$_K$ at a bias voltage minimizing the odd-order or maximizing the even-order component of side bands and the n-th order side band (S$_{n,k}^{(+)}$) of the MZI$_K$ at a bias voltage maximizing the odd-order or minimizing the even-order component of side bands. Then, the extinction ratio ($\eta_K$), chirp parameter ($\alpha_K^*$), or half-wavelength voltage (V$_{\pi,K}$) by using the measured S$_{n,k}^{(-)}$ and S$_{n,k}^{(+)}$. Incidentally, odd numbers include herein negative numbers (for example, −1) and even numbers include negative numbers (for example, −2). On the other hand, the zero-order component of an output signal is not a side band and so is not included in even-order side bands.

The preferred embodiment of the first aspect of the present invention includes a process of evaluating measurement accuracy of A$_K$. This method determines the first A$_K$ by using, for example, the first order and second order side bands. Further, the method determines the second A$_K$ by using the first or second order side band and the third order side band. Then, the method evaluates the measurement accuracy of A$_K$ by determining whether values of the first A$_K$ and the second A$_K$ are close.

The preferred embodiment of the first aspect of the present invention includes a process of determining the insertion loss (K$_K$) of the MZI$_K$ by using S$_{n,k}^{(-)}$ or S$_{n,k}^{(+)}$.

The preferred embodiment of the first aspect of the present invention includes, if the modulation index of the first arm of two arms of the MZI$_K$ is A$_{1,K}$, the chirp parameter of the MZI$_K$ is $\alpha_K^*$, $A_K$ is a value defined as $A_K=A_{1,K}+\alpha_K^*$, and $J_n$ is a Bessel function of the first kind, a process of determining $A_K$ by assuming that $A_K$ is smaller than a predetermined value of $A_K$ if $J_2(A_K)>J_3(A_K)$ and determining $A_K$ by assuming that $A_K$ is larger than the predetermined value of $A_K$ if $J_2(A_K)<J_3(A_K)$.

The preferred embodiment of the first aspect of the present invention includes, if the n-th order side band of the $MZI_K$ at a bias voltage maximizing the n-th order side band is $S_{n,K}^+$, the modulation index of the first arm of two arms of the $MZI_K$ is $A_{1,K}$, the chirp parameter of the $MZI_K$ is $\alpha_K^*$, and $A_K$ is a value defined as $A_K=A_{1,K}+\alpha_K^*$, a process of determining $A_K$ by assuming that $A_K$ is smaller than a predetermined value of $A_K$ if $S_{2,K}^+>S_{3,K}^+$ and determining $A_K$ by assuming that $A_K$ is larger than the predetermined value of $A_K$ if $S_{2,K}^+<S_{3,K}^+$.

The preferred embodiment of the first aspect of the present invention further includes a process of adjusting the strength of a radio frequency signal applied to the $MZI_K$ so that a difference between $S_{1,K}^+$ and the strength of the zero-order component of an output signal and a difference between $S_{2,K}^+$ and the strength of the zero-order component of the output signal are within the dynamic range of the system of measurement when the n-th order side band of the $MZI_K$ at a bias voltage maximizing the n-th order side band is $S_{n,K}^+$. The first aspect of the present invention includes appropriate combinations of all the above embodiments.

A second aspect of the present invention relates to a system that evaluates characteristics of an optical modulator containing a plurality of Mach-Zehnder interferometers (MZIs). The system includes a control apparatus. The control apparatus contains an input unit that receives measurement information from an optical detector that measures output light of the optical modulator and a computer that performs predetermined operation processing based on the received measurement information.

The control unit causes the computer to function so as to evaluate characteristics of the optical modulator by causing the computer to execute steps including the process of measuring output strength and the process of evaluating characteristics of MZIs by using side bands. Processes of all embodiments described in the first aspect can be appropriately combined as each process.

Technical Effect of the Invention

According to the present invention, a method for evaluating characteristics of individual MZIs in an optical modulator containing a plurality of MZIs can be provided.

REFERENCE SIGNS LIST

Figure 1:
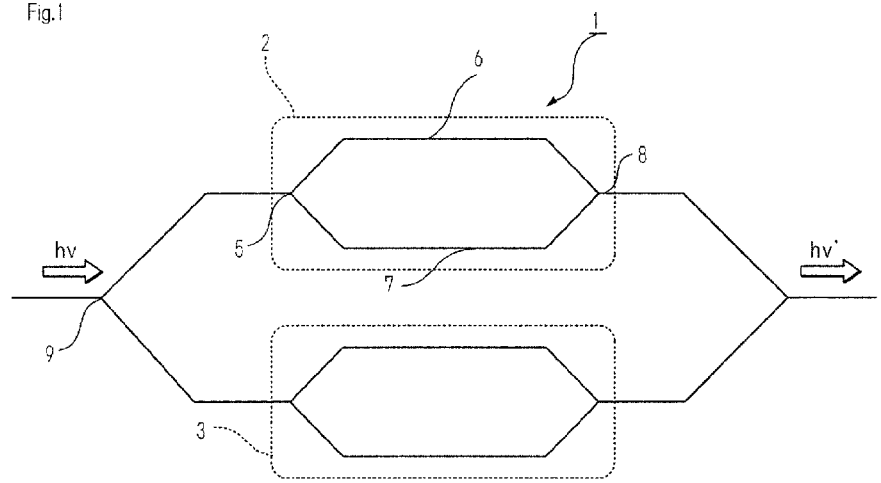
FIG. 1 is a diagram showing an example of an optical modulator containing a Mach-Zehnder interferometer.

1 Optical modulator
2 First Mach-Zehnder interferometer
3 Second Mach-Zehnder interferometer
5 Demultiplexing unit
6 First arm
7 Second arm
8 Multiplexing unit
9 Input unit
21 Optical modulator
22, 23, 24, 25 Mach-Zehnder interferometer
26 to 32 Electrode
33 Demultiplexing unit
34 Multiplexing unit
41 Optical modulator
51 Optical modulator

DESCRIPTION OF EMBODIMENTS

The first aspect of the present invention relates to a method for evaluating characteristics of an optical modulator including Mach-Zehnder interferometers (MZI). Each MZI includes a demultiplexing unit, two arms, a multiplexing unit, and electrodes. The two arms are connected to the demultiplexing unit. The multiplexing unit is connected to the two arms. The electrodes can apply, for example, a bias voltage to the two arms and can further apply a modulating signal to the two arms. Each of the two arms functions as a phase modulator. Each MZI includes a demultiplexing unit, two arms, a multiplexing unit, and electrodes. Each of the two arms transmits a light signal and includes a phase modulator to perform phase modulation on transmitting light. The two arms are connected via the demultiplexing unit. Accordingly, a light signal is demultiplex into a first arm 6 and a second arm 7 via the demultiplexing unit. The two arms are also connected via the multiplexing unit. Accordingly, lights transmitted through the two arms are multiplexed by the multiplexing unit. The electrodes can apply a voltage to the two arms. Accordingly, the MZI including the two arms can be caused to function as a Mach-Zehnder interferometer. As disclosed by, for example, Japanese Patent No. 3538619 and Japanese Patent No. 3866082, the basic configuration and operation of the Mach-Zehnder interferometer (MZI) are already known. The configuration and operation of such a Mach-Zehnder interferometer is incorporated into the present specification by reference.

FIG. 1 is a diagram showing an example of an optical modulator containing a Mach-Zehnder interferometer. This optical modulator 1 includes a first Mach-Zehnder interferometer 2 and a second Mach-Zehnder interferometer 3. The first Mach-Zehnder interferometer 2 includes a demultiplexing unit 5, the two arms 6, 7, a multiplexing unit 8, and electrodes (not shown). Thus, the optical modulator shown in FIG. 1 has the two Mach-Zehnder interferometers 2, 3 placed in parallel. The optical modulator also functions as a Mach-Zehnder interferometer using the Mach-Zehnder interferometers 2, 3 as the two arms. Such a Mach-Zehnder interferometer is called a nested Mach-Zehnder interferometer and the Mach-Zehnder interferometer constituting each arm is also called a sub-Mach-Zehnder interferometer and the Mach- Zehnder interferometer using two Mach-Zehnder interferometers as two arms is also called a main Mach-Zehnder interferometer.

Such a nested Mach-Zehnder interferometer is, as disclosed by, for example, Japanese Patent Application Laid-Open No. 2008-116865, Japanese Patent Application Laid-Open No. 2007-086207, and Japanese Patent Application Laid-Open No. 2007-57785, already known. The configuration and operation of such a nested Mach-Zehnder interferometer is incorporated into the present specification by reference. These optical modulators function as, for example, an optical single sideband modulator (optical SSB modulator) or an optical frequency shift keying (optical FSK) apparatus.

Two sub-Mach-Zehnder interferometers $MZ_A$ 2 and $MZ_B$ 3 are connected via the demultiplexing unit 5. Thus, light entering an input unit 9 of a light signal is branched to the two sub-Mach-Zehnder interferometers $MZ_A$ 2 and $MZ_B$ 3 via the demultiplexing unit 5.

The two sub-Mach-Zehnder interferometers $MZ_A$ 2 and $MZ_B$ 3 are connected via the multiplexing unit 8. Thus, output lights from the two sub-Mach-Zehnder interferometers $MZ_A$ 2 and $MZ_B$ 3 are multiplexed by the multiplexing unit 8 and output from an output unit of the light signal.

The $MZ_A$ includes an electrode A. On the other hand, the $MZ_B$ 3 also includes an electrode B. These electrodes are used to cause the $MZ_A$ and the $MZ_B$ to function as a Mach-Zehnder interferometer. These electrodes are normally traveling wave electrodes. An RF signal for high-speed control is applied to the electrode A and the electrode B and further, a low-frequency signal for DC bias control is applied. Further, $MZ_C$ includes an electrode C having an operation to adjust the phase of output signals from the two sub-Mach-Zehnder interferometers $MZ_A$ 2 and $MZ_B$ 3.

Signals are applied to each electrode from signal sources. The signals applied to each electrode are controlled by a control apparatus connected to the signal sources.

Figure 2:
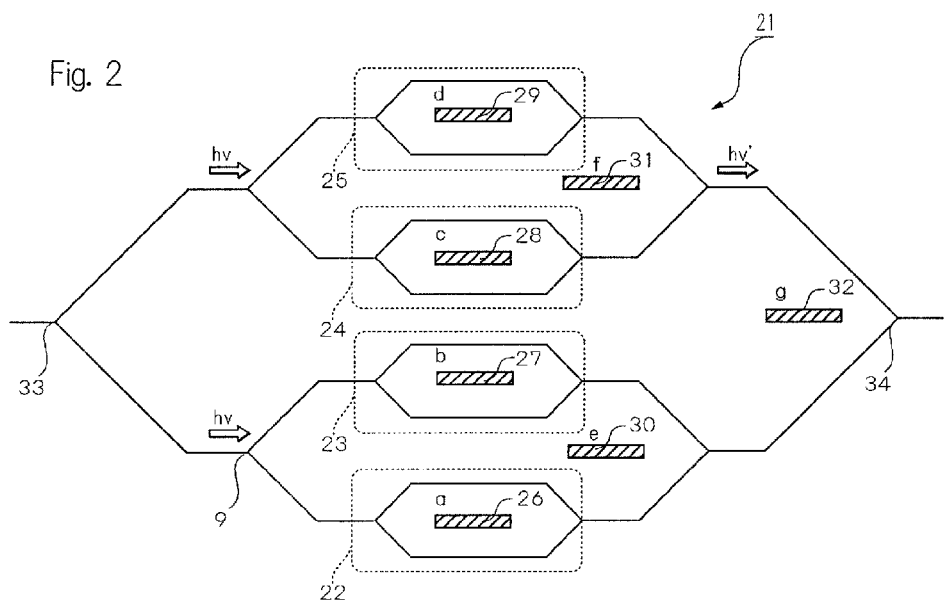
FIG. 2 is a diagram showing an example of the optical modulator having a plurality of Mach-Zehnder interferometers.

FIG. 2 is a diagram showing an example of the optical modulator having a plurality of Mach-Zehnder interferometers. This optical modulator 21 has two main Mach-Zehnder interferometers. Each of the main Mach-Zehnder interferometers has two sub-Mach-Zehnder interferometers. In this example, the Mach-Zehnder interferometer to be evaluated is denoted by reference numeral 22. On the other hand, the optical modulator includes Mach-Zehnder interferometers 23, 24, 25 that are not evaluated. FIG. 2 also shows electrodes 26 to 32 to control the phase between both arms of each MZI. These electrodes are called electrodes a to g. The phase difference between MZIs is controlled by the electrodes e, f, g.

The two main Mach-Zehnder interferometers are connected via a demultiplexing unit 33. Thus, light entering an input unit of a light signal is branched to the two sub-Mach-Zehnder interferometers via the demultiplexing unit 33.

The two Mach-Zehnder interferometers are connected via a multiplexing unit 34. Thus, output lights from the two sub-Mach-Zehnder interferometers are multiplexed by the multiplexing unit 34 and output from an output unit of the light signal.

The optical modulator shown in FIG. 2 functions as a quadrature amplitude modulation (QAM) signal generator. That is, the present invention can effectively be used to evaluate characteristics of some Mach-Zehnder waveguide contained in a quadrature amplitude modulation (QAM) signal generator.

Figure 3:
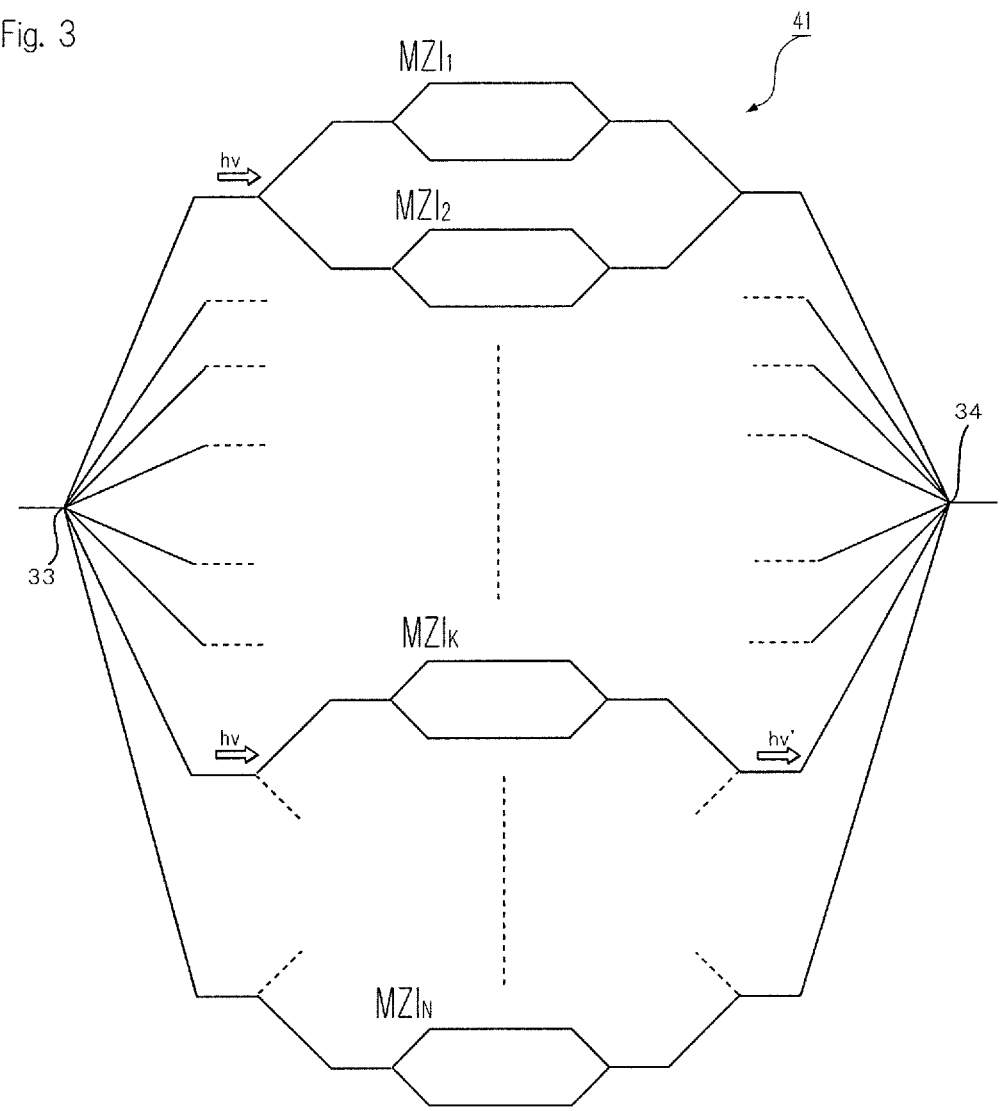
FIG. 3 is a diagram showing an example of the optical modulator containing the plurality of Mach-Zehnder interferometers.

FIG. 3 is a diagram showing an example of the optical modulator containing the plurality of Mach-Zehnder interferometers. This optical modulator 41 has a plurality of Mach-Zehnder interferometers placed side by side. More specifically, FIG. 3 relates to an optical modulator in which N/2 nested Mach-Zehnder interferometers are connected in parallel. The optical modulator shown in FIG. 3 includes N Mach-Zehnder interferometers ($MZI_1$ to $MZI_N$). The Mach-Zehnder interferometer is the K-th (K=1 to N) MZI ($MZI_K$) branched by a branch point.

The N/2 main Mach-Zehnder interferometers are connected via the demultiplexing unit 33. Thus, light entering an input unit of a light signal is branched to the N/2 main Mach-Zehnder interferometers via the demultiplexing unit 33. Each of the main MZIs includes a demultiplexing unit. Thus, light entering the main MZI is branched to two sub-MZI via the demultiplexing unit.

The N/2 main Mach-Zehnder interferometers are connected via the multiplexing unit 34. Thus, output lights from the N/2 main Mach-Zehnder interferometers are multiplexed by the multiplexing unit 34 and output from an output unit of the light signal.

Next, the principle of the evaluation method of the present invention will be described. If an RF signal $\sin \omega_m t$ is applied to the K-th interferometer ($MZI_K$), output light P is represented by Formula (1) or Formula (2) below:

[Math 1]

$$P = \frac{K_k e^{i\omega_0 t}}{2} \sum_n e^{in\omega_m t}\left[J_n(A_{1,k})e^{in\phi_{1,k}}e^{iB_{1,k}}\left(1+\frac{\eta_k}{2}\right) + J_n(A_{2,k})e^{in\phi_{2,k}}e^{iB_{2,k}}\left(1-\frac{\eta_k}{2}\right)\right] + G_k e^{i\omega_0 t} \quad (1)$$

$$= \frac{K_k e^{i\omega_0 t} e^{i(n\phi_{1,k}+B_{1,k})}}{2}\sum_n e^{in\omega_m t}\left[J_n(A_k + \alpha_k^*)\left(1+\frac{\eta_k}{2}\right) + J_n(-A_k + \alpha_k^*)\left(1-\frac{\eta_k}{2}\right)e^{i(n\phi_k+B_k)}\right] + G_k e^{i\omega_0 t} \quad (2)$$

where $K_K$ is the insertion loss of $MZI_K$. $K_K$ is caused by imperfection of the waveguide and absorption by materials excluding a principle loss in a branch portion and is also called an excess loss. $\omega_0$ denotes the angular frequency of a carrier signal. $A_{1,K}$ and $A_{2,K}$ are parameters (modulation index) denoting the depth of modulation of the respective arms of $MZI_K$. $\phi_{1,K}$ and $\phi_{2,K}$ denote different phases of a modulating signal depending on the arm and $B_{1,K}$ and $B_{2,K}$ represent phases depending on the structure and state of the waveguide of the respective arms. $\eta_K$ represents a light intensity difference (extinction ratio) between the arms. $\eta_K$ represents an optical loss difference between the arms or a magnitude of an unbalance of interferometers due to imperfection of the branch portion. $J_n$ represents the Bessel function of the first kind. $G_K$ represents a component of non-modulated light from other MZIs.

A change of the optical phase of each arm of the $MZI_K$ is represented by Formula (3) or Formula (4) below:
[Math 2]

$$\Phi_{1,k} = A_{1,k}\sin(\omega_m t + \phi_{1,k}) + B_{1,k} \quad (3)$$

$$\Phi_{2,k} = A_{2,k}\sin(\omega_m t + \phi_{2,k}) + B_{2,k} \quad (4)$$

Definitions are provided as shown below:
[Math 3]

$$A_{1,k} = A_k + \alpha_k^* \quad (5)$$

$$A_{2,k} = -A_k + \alpha_k^* \quad (6)$$

$$\alpha_k^* = A_k \alpha_{0,k} \quad (7)$$

$$B_k = B_{2,k} - B_{1,k} \tag{8}$$

$$\phi_k = \phi_{2,k} - \phi_{1,k} \tag{9}$$

To obtain ideal intensity modulation, push-pull phase modulation in both arms of the MZI is needed. If $A_{1,K} = -A_{2,K}$ ($\alpha_{0,K} = \alpha_K^* = 0$), balanced push-pull phase modulation is achieved. $\alpha_{0,K}$ represents a shift from the ideal push-pull operation. $\alpha_K^*$ is a chirp parameter representing an unbalance of modulation depths. $B_K$ is a DC-like optical phase difference between the two arms and is called a bias. $B_K = \pm \pi/2$ is normally set for intensity modulation. $B_K = \pi$ is set for binary phase modulation ($\pm 1$ are set as symbols). $\phi_K$ represents a phase shift (skew) of RF signals applied to both arms. If both arms have separate electrodes, $\phi_K$ can be made approximately 0 by controlling the phase using an external circuit. Moreover, a skew influence can frequently be ignored when a push-pull operation is obtained by one RF signal input based on a device structure (such as an X cut MZ modulator).

Output of an optical modulator contains non-modulated lights from other MZIs. The intensity and phase of non-modulated light from other MZIs depends on bias states $B_{1,K}$, $B_{2,K}$ ($j \neq k$) and can be represented as Formula (10) below:

[Math 4]

$$G_k = \sum_{j=1}^{N} \frac{K_j}{2} \left[ e^{iB_{1,j}} \left(1 + \frac{\eta_j}{2}\right) + e^{iB_{2,j}} \left(1 - \frac{\eta_j}{2}\right) \right] - \frac{K_k}{2} \left[ e^{iB_{1,k}} \left(1 + \frac{\eta_k}{2}\right) + e^{iB_{2,k}} \left(1 - \frac{\eta_k}{2}\right) \right] \tag{10}$$

If $\phi_K = 0$ is set by ignoring the skew influence, the strength of the n-th order side band component $S_{n,K}$ ($n \neq 0$) of the $MZI_K$ can be represented as Formula (11) or Formula (12) below:

[Math 5]

$$S_{n,k} = \frac{K_k^2}{4} \left| J_n(A_k + \alpha_k^*)\left(1 + \frac{\eta_k}{2}\right) + J_n(-A_k + \alpha_k^*)\left(1 - \frac{\eta_k}{2}\right) e^{iB_k} \right|^2 \tag{11}$$

$$= \frac{K_k^2}{4} \left[ J_n^2(A_k + \alpha_k^*)\left(1 + \frac{\eta_k}{2}\right)^2 + J_n^2(-A_k + \alpha_k^*)\left(1 - \frac{\eta_k}{2}\right)^2 + 2\cos B_k J_n(A_k + \alpha_k^*) J_n(-A_k + \alpha_k^*)\left(1 - \frac{\eta_k^2}{4}\right) \right] \tag{12}$$

The n-th order side band component is a portion to be the coefficient of $\exp(\omega_m t)$ in Formula (2) and this corresponds to the component whose optical frequency is $(\omega_0 + n\omega_m)/2$. It is clear that the zero-order component contains the component $G_K$ from other MZIs. Thus, the strength of side band components of $n \neq 0$ can be correctly measured without being affected by bias states of MZIs other than the $MZI_K$. The strength of the zero-order component of an output signal can be controlled by controlling the bias voltage applied to the $MZI_K$ and a single tone RF signal. $S_{n,K} = S_{-n,K}$ is obtained if the skew is ignored. Thus, an evaluation can be made regardless of whether a component of positive n or negative n is measured. Moreover, whether the skew is at a level at which the skew can be ignored can be estimated by checking whether $S_{n,K} = S_{-n,K}$ is satisfied for any bias state.

When $|\alpha_{0,K}|$, $|\eta_K| \ll 1$, an odd-order term (n is an odd number) is minimal and an even-order term (n is an even number) is maximal if $B_K = 0$ and, on the other hand, an odd-order term is maximal and an even-order term is minimal if $B_K = \pi$. If the bias voltage is continuously increased or decreased, the odd-order component and the even-order component alternately take maximum and minimum values repeatedly. Therefore, the state of $B_K = 0$ or $B_K = \pi$ can be obtained by adjusting the bias voltage while monitoring a light spectrum.

The side band component $S_{n,K}$ is measured under the bias condition $B_K = 0$ when the odd-order component of side bands is minimal and the even-order component is maximal and under the bias condition $B_K = \pi$ when the odd-order component of side bands is maximal and the even-order component is minimal to establish a nonlinear simultaneous equation for $A_K$, $\alpha_K^*$, and $\eta_K \cdot A_K$, $\alpha_K^*$, and $\eta_K$ can be obtained by solving the nonlinear simultaneous equation.

The odd-order side band component when $B_K = 0$ and the even-order side band component when $B_K = \pi$ are set as $S_{n,K}^{(-)}$ and the odd-order side band component when $B_K = \pi$ and the even-order side band component when $B = 0$ are set as $S_{n,K}^{(+)}$. In other words, when the bias state is changed, the maximum value of the n-th order side band component corresponds to $S_{n,K}^{(+)}$ and the minimum value corresponds to $S_{n,K}^{(-)}$.

The first order side band component when $B_K = 0$ can be represented as Formula (13) or Formula (14) below:

[Math 6]

$$S_{1,k}^{(-)} = \frac{K_k^2}{4} \left[ J_1(A_k + \alpha_k^*)\left(1 + \frac{\eta_k}{2}\right) - J_1(A_k - \alpha_k^*)\left(1 - \frac{\eta_k}{2}\right) \right]^2 \tag{13}$$

$$= \frac{K_k^2}{4} \left[ \eta_k \frac{J_1(A_k + \alpha_k^*) + J_1(A_k - \alpha_k^*)}{2} + J_1(A_k + \alpha_k^*) - J_1(A_k - \alpha_k^*) \right]^2 \tag{14}$$

If $\alpha_{0,K} \ll 1$, approximations as shown in Formula (15) and Formula (16) can be provided:

[Math 7]

$$\frac{J_1(A_k + \alpha_k^*) + J_1(A_k - \alpha_k^*)}{2} \simeq J_1(A_k) \tag{15}$$

$$J_1(A_k + \alpha_k^*) - J_1(A_k - \alpha_k^*) \simeq 2\alpha_k^* J_1'(A_k) \tag{16}$$

$J_n'(A_K)$ is a derivative of $J_n(A_K)$. Using these approximations, the first order side band component when $B_K = 0$ can be approximated as Formula (17):

[Math 8]

$$S_{1,k}^{(-)} \simeq \frac{K_k^2}{4} [\eta_k J_1(A_k) + 2\alpha_k^* J_1'(A_k)]^2 \tag{17}$$

Similarly, the second order component can be represented as Formulas (18) to (21):

[Math 9]

$$S_{2,k}^{(+)} = \frac{K_k^2}{4}\left[J_2(A_k + \alpha_k^*)\left(1 + \frac{\eta_k}{2}\right) + J_2(A_k - \alpha_k^*)\left(1 - \frac{\eta_k}{2}\right)\right]^2 \quad (18)$$

$$= \frac{K_k^2}{4}\left[\begin{array}{c}J_2(A_k + \alpha_k^*) + J_2(A_k - \alpha_k^*) + \\ \eta_k \dfrac{J_2(A_k + \alpha_k^*) - J_2(A_k - \alpha_k^*)}{2}\end{array}\right]^2 \quad (19)$$

$$\simeq \frac{K_k^2}{4}[2J_2(A_k) + \alpha_k^* \eta_k J_2'(A_k)]^2 \quad (20)$$

$$\simeq K_k^2[J_2(A_k)]^2 \quad (21)$$

Similarly, the n-th order component can be represented as Formulas (22) to (24):

[Math 10]

$$S_{n,k}^{(+)} \simeq \frac{K_k^2}{4}[2J_n(A_k) + \alpha_k^* \eta_k J_n'(A_k)]^2 \quad (22)$$

$$\simeq K_k^2[J_n(A_k)]^2 \quad (23)$$

$$S_{n,k}^{(-)} \simeq \frac{K_k^2}{4}[\eta_k J_n(A_k) + 2\alpha_k^* J_n'(A_k)]^2 \quad (24)$$

To determine $A_K$, $\alpha_K^*$, and $\eta_K$, the side band components of a relatively low order may be used. If, for example, $S_{1,K}^{(+)}$ and $S_{2,K}^{(+)}$ are measured, $A_K$ can be determined by Formula (25) below:

[Math 11]

$$\frac{S_{2,k}^{(+)}}{S_{1,k}^{(+)}} \simeq \left[\frac{J_2(A_k)}{J_1(A_k)}\right]^2 \quad (25)$$

If, for example, the third side band can be measured, $A_K$ can be determined by Formula (26) or Formula (27) below:

[Math 12]

$$\frac{S_{3,k}^{(+)}}{S_{1,k}^{(+)}} \simeq \left[\frac{J_3(A_k)}{J_1(A_k)}\right]^2 \quad (26)$$

$$\frac{S_{3,k}^{(+)}}{S_{2,k}^{(+)}} \simeq \left[\frac{J_3(A_k)}{J_2(A_k)}\right]^2 \quad (27)$$

By checking $A_K$ calculated by using the third order side band against $A_K$ calculated by Formula (25), the accuracy of measurement and approximate calculations can be checked. Next, the method of determining $\alpha_{0,K}$ and $\eta_K$ by using $S_{n,K}^{(+)}$ and $S_{n,K}^{(-)}$ will be described. $S_{n,K}^{(+)}$ and $S_{n,K}^{(-)}$ are related to $A_K$, n, $\alpha_K^*$ and $\eta_K$ by Formulas (28) to (31):

[Math 13]

$$\frac{S_{n,k}^{(-)}}{S_{n,k}^{(+)}} \simeq \left\{\frac{\eta_k J_n(A_k) + 2\alpha_k^* J_n'(A_k)}{2J_n(A_k) + \alpha_k^* \eta_k J_n'(A_k)}\right\}^2 \quad (28)$$

$$\simeq \left\{\frac{\eta_k J_n(A_k) + 2\alpha_k^* J_n'(A_k)}{2J_n(A_k)}\right\}^2 \quad (29)$$

$$= \left\{\frac{\eta_k}{2} + \alpha_k^* \frac{J_n'(A_k)}{J_n(A_k)}\right\}^2 \quad (30)$$

$$= \left[\frac{\eta_k}{2} + \alpha_k^*\left\{\frac{J_{n-1}(A_k)}{J_n(A_k)} - \frac{n}{A_k}\right\}\right]^2 \quad (31)$$

In the above formulas, $J_n'$ is a derivative of $J_n$ and $J_n' = J_{n-1}(A) - n J_n(A)/A$. $\alpha_{0,K}$ and $\eta_K$ can be determined by, for example, measuring $S_{1,K}^{(+)}$, $S_{1,K}^{(-)}$, $S_{2,K}^{(+)}$, and $S_{2,K}^{(-)}$ and solving the binary simultaneous equation of Formulas (32) and (33):

[Math 14]

$$\frac{S_{1,k}^{(-)}}{S_{1,k}^{(+)}} \simeq \left[\frac{\eta_k}{2} + \alpha_k^*\left\{\frac{J_0(A_k)}{J_1(A_k)} - \frac{1}{A_k}\right\}\right]^2 \quad (32)$$

$$\frac{S_{2,k}^{(-)}}{S_{2,k}^{(+)}} \simeq \left[\frac{\eta_k}{2} + \alpha_k^*\left\{\frac{J_1(A_k)}{J_2(A_k)} - \frac{2}{A_k}\right\}\right]^2 \quad (33)$$

The binary simultaneous equation of Formulas (32) and (33) can easily be solved by calculating the square root of both sides. In this case, it is necessary to solve four binary simultaneous equations of Formula (34) and Formula (35) below:

[Math 15]

$$\eta_k + \alpha_k^*\left\{\frac{J_0(A_k)}{J_1(A_k)} - \frac{1}{A_k}\right\} = \pm\sqrt{\frac{S_{1,k}^{(-)}}{S_{1,k}^{(+)}}} \quad (34)$$

$$\frac{\eta_k}{2} + \alpha_k^*\left\{\frac{J_1(A_k)}{J_2(A_k)} - \frac{2}{A_k}\right\} = \pm\sqrt{\frac{S_{2,k}^{(-)}}{S_{2,k}^{(+)}}} \quad (35)$$

If the sign on the right side is inverted, it is evident that solutions are obtained by inverting the sign of solutions of $\alpha_K^*$ and $\eta_K$ of the equation before the inversion. Only the coefficient portion of $\alpha_K^*$ is different in equations of higher-order side band components and thus, it is generally impossible to determine the sign of $\alpha_K^*$ and $\eta_K$ from the maximum value and minimum value $S_{n,K}^{(-)}$, $S_{n,K}^{(+)}$ of strength of the side band components. However, whether $\alpha_K^*$ and $\eta_K$ have the same sign or different signs, that is, the signs of $\alpha_K^*$ and $\eta_K$ can be obtained. Physically meaningful solutions can be determined by solving two equations depending on whether the right sides of Formulas (34), (35) have the same sign or different signs and whether each solution satisfies equations of higher-order side bands. For example, the right side of Formula (34) is set as positive and two linear simultaneous equations are formulated by setting the right side of Formula (35) as positive and negative and then, $\alpha_K^*$ and $\eta_K^*$ are determined from each equation. $A_K$ determined from $S_{1,K}^{(+)}$ and $S_{2,K}^{(+)}$ is used here. If any higher-order term can be measured, like the procedure for calculating $A_K$, measurement accuracy can be checked from the equation of $S_{3,K}^{(+)}$ and $S_{3,K}^{(-)}$. The sign of $A_K$ relates to the definition of an input signal and arms and generality is not lost if the sign of $A_K$ is assumed to be positive.

Obtained solutions are substituted into Formula (36) below and solutions satisfying Formula (36) are regarded as physically meaningful solutions.

[Math 16]

$$\frac{S_{3,k}^{(-)}}{S_{3,k}^{(+)}} \simeq \left[\frac{\eta_k}{2} + \alpha_k^*\left\{\frac{J_2(A_k)}{J_3(A_k)} - \frac{3}{A_k}\right\}\right]^2 \quad (36)$$

The ratio of the maximum value and the minimum value of side band components of each order is used. Similarly, $A_K$, $\alpha_K^*$, and $\eta_K$ can be determined from equations and approximations of $S_{n,K}^{(-)}$ and $S_{m,K}^{(+)}$ ($n \neq m$).

From the foregoing, $S_{1,K}^{(+)}$, $S_{1,K}^{(-)}$, $S_{2,K}^{(+)}$, $S_{2,K}^{(-)}$, $S_{3,K}^{(+)}$, and $S_{3,K}^{(-)}$ are measured to be able to calculate $A_K$ by using Formula (25) and further determine $\alpha_K^*$ and $\eta_K$ by Formulas (32) and (33). To improve the accuracy still further, a nonlinear simultaneous equation concerning $\alpha_K^*$ and $\eta_K$ may be formulated by using Formulas (37) and (38) below before Formulas (15) and (16) are applied to solve the equation.

[Math 17]

$$S_{n,k}^{(-)} = \quad (37)$$
$$\frac{K_k^2}{4}\left[\eta_k \frac{J_n(A_k + \alpha_k^*) + J_n(A_k - \alpha_k^*)}{2} + J_n(A_k + \alpha_k^*) - J_n(A_k - \alpha_k^*)\right]^2$$

$$S_{n,k}^{(+)} = \quad (38)$$
$$\frac{K_k^2}{4}\left[J_n(A_k + \alpha_k^*) + J_n(A_k - \alpha_k^*) + \eta_k \frac{J_n(A_k + \alpha_k^*) - J_n(A_k - \alpha_k^*)}{2}\right]^2$$

To reliably obtain a solution, $A_K$, $\alpha_{0,K}$, and $\eta_K$ determined from approximations may be set as initial values. Alternatively, the method of improving the accuracy by repeating the procedure in which two of three variable are fixed to solutions of approximations, formulating a nonlinear equation for the remaining variable, and substituting the solution thereof to solve an equation of the fixed variables is also effective.

$\alpha_{0,K}$ can be determined from $\alpha_{0,K} = \alpha_K^*/A_K$. The half-wavelength voltage can be obtained by precisely measuring the voltage (the voltage can be calculated only by measuring power if the impedance is matched) of an applied RF signal. If the RF signal voltage applied to a modulator is $V_{0P}$ (zero to peak), the half-wavelength voltage $V_{\pi,K}$ of the $MZI_K$ can be represented by Formula (39) below:

[Math 18]

$$V_{\pi,k} = \frac{\pi V_{0p}}{2|A_k|} \quad (39)$$

The ON/OFF extinction ratio is $\eta_K/2$ if represented by the amplitude and $\eta_K^2/4$ if represented by the intensity. By making the above measurements while changing the frequency of the RF signal, frequency characteristics of the half-wavelength voltage, extinction ratio, and chirp parameter can be obtained. Moreover, wavelength dependency is obtained by making measurements while changing the wavelength of input light.

Further, if input light power of the modulator is measured and $S_{n,K}^{(\pm)}$ is normalized to set the measured input light power to 1, $K_K$ can be determined. For example, the square root of the quotient obtained by dividing first order side band strength from $S_{1,K}^{(+)}$ by input optical power becomes $K_K$. The unbalance among a plurality of MZIs can be evaluated by making similar measurements for each MZI to obtain all $K_K$. In addition, the optical loss for the whole modulator is given approximately by $\Sigma_K K_K$.

If there is a single Mach-Zehnder modulator or the bias of other MZIs can be controlled, $S_{0,K}^{(+)}$ and the equation concerning $S_{0,K}^{(+)}$ can be used. If settings are made so that other MZIs are turned off, $G_K = 0$ is obtained, making the calculation simpler.

The method according to the first aspect relates to a method for evaluating characteristics of an optical modulator containing a plurality of Mach-Zehnder interferometers (MZIs). The optical modulator contains N (N is an integer 2 or more) MZIs connected in parallel. In the description that follows, the MZI to be evaluated is assumed to be the K-th MZI ($MZI_K$) and the intensity of the n-th order side band component of the $MZI_K$ is set as $S_{n,K}$. The method according to the first aspect is based on the above principle. The method includes a process of measuring output strength and a process of evaluating characteristics of the MZI using side bands. In an example of N (N is an integer 2 or more) MZIs connected in parallel, light signals branched by one demultiplexing unit are transmitted and output signals from N MZIs are multiplexed by one multiplexing unit. An optical modulator used in the present invention may be an optical modulator having N/2 nested NZIs in parallel. Examples of characteristics of the MZI include the extinction ratio ($\eta_K$), chirp parameter ($\alpha_K^*$) half-wavelength voltage ($V_{\pi K}$), and the value ($A_K$) related to the modulation index and chirp parameter.

The preferred embodiment of the first aspect of the present invention further includes a process of suppressing the zero-order component contained in output light from the optical modulator by adjusting a bias voltage applied to the MZIs other than the $MZI_K$ of the plurality of MZIs. Then, the process of measuring output strength is a process of determining a strength ($S_{n,K}$) of a side band signal contained in output light from the optical modulator in which the zero-order component is suppressed. That is, the zero-order component is not used for evaluation in the present invention. However, if the zero-order strength is high, measurement accuracy of side bands decreases. Thus, the embodiment includes a process of adjusting the bias voltages of MZIs other than the MZI to be measured. If the bias voltages applied to the MZIs other than the $MZI_K$, only the zero-order component ($G_K$ component) changes without any change of the strength of side bands. Thus, the zero-order component can easily be suppressed by adjusting the bias voltages applied to MZIs other than the $MZI_K$. As a result, the strength ratio of side bands to the zero-order component can be improved, increasing measurement accuracy.

The process of suppressing the zero-order component is a process of adjusting an optical modulator so that the zero-order of output from the optical modulator is suppressed. The process may be performed by making fine adjustments of the bias voltage while monitoring output from the MZ interferometer. The process does not affect side bands of output light from the optical modulator. Thus, the process of suppressing the zero-order component may be performed before the process of measuring output strength or concurrently with the process of measuring output strength. To avoid a situation in which the measured value varies in the process of measuring output strength, it is preferable to perform the process of suppressing the zero-order component before the process of measuring output strength. The process of suppressing the zero-order component may be performed automatically based on a control apparatus. Such an optical modulator contains, for example, a photo-detector. Then, the photo-detector measures output light from the MZ interferometer. The photo-detector obtains intensity information of the carrier component (zero-order component) from the detected spectrum of output light. More specifically, the photo-detector extracts intensity of the carrier frequency component contained in the spectrum. Then, the photo-detector conveys the intensity information of the carrier component to the control apparatus. Alternatively, the photo-detector conveys the detected optical spectrum to the control apparatus. The control apparatus extracts the carrier component from the optical spectrum to measure the intensity of the carrier component. Because, for example, the control apparatus has acquired the frequency of the carrier component, the carrier component can easily be grasped. Moreover, the carrier component can easily be grasped from the symmetry of an optical spectrum. The control apparatus issues control instructions to a bias power supply based on the input intensity information of the carrier component. The bias power supply applies a bias voltage to electrodes of MZIs according to the control instructions. The MZI may be any MZI other than the $MZI_K$. Bias voltages applied to all MZIs other than the $MZI_K$ may be adjusted. The bias voltage of the $MZI_K$ may be adjusted. Such work is repeated until the strength of the zero-order component becomes weaker. The work may be done until the zero-order component falls to a predetermined value or below. This case can be accomplished by the predetermined value being stored by a storage apparatus and an operation unit being caused by the control apparatus to perform an operation of comparing an observed zero-order component and the predetermined value read from the storage apparatus. This process may be performed by, for example, causing a storage unit to store the strength of the zero-order component before bias adjustments until the zero-order component falls to a predetermined ratio of the initial value thereof or below. Further, the process may be performed by determining the bias voltage when the strength of the zero-order component is the weakest by sweeping the bias voltage applied to the MZI while observing output from the optical modulator to set the bias voltage as the bias voltage applied to one or more MZIs other than the $MZI_K$. By various methods described above, the zero-order component can be suppressed.

The process of measuring output strength is a process of determining the strength $S_{n,K}$ of a side band signal contained in output light from an optical modulator. The strength $S_{n,K}$ of a side band signal is preferably a strength that takes the maximum value or the minimum value when the bias voltage of the $MZI_K$ is adjusted and particularly preferably a strength that takes the maximum value. The strength increases and resistance to noise grows with a decreasing absolute value of the order of side bands. Thus, ±first order to ±fourth order components are preferable as the n-th order component and more desirable are ±first order to ±third order components and most desirable are ±first order to ±second order components. Incidentally, operations may be performed by using ±second order components and ±third order components. An example of the process of determining the strength of the first order component and the strength of the second order component will be described below. The frequency of the first order component is $f_0+f_m$ (the carrier frequency is set as $f_0$ and the modulation frequency is set as $f_m$). Thus, the strength of the first order component can easily be determined by analyzing the frequency position where the side band is present of the output spectrum of an optical modulator. The frequency of the second order component is $f_0+2f_m$. Thus, the strength of the second order component can easily be determined from the output spectrum of an optical modulator.

The process of measuring the output strength may be performed automatically by using the control apparatus. More specifically, when the strength of the first order component is determined, the peak near $f_0+f_m$ the spectrum of output light may be determined. The strength may also be determined by determining an area using the integral calculus after the peak contained in the spectrum being fitted by using the Gaussian distribution or the like.

The process of evaluating characteristics including the process of evaluating characteristics of the $MZI_K$ by using $S_{n,K}$ may be performed automatically by using a control apparatus. Such a control apparatus includes a control apparatus having a program to solve a simultaneous equation or a program capable of handling the Bessel function. Individual and concrete characteristic evaluations will be described below.

Method of Evaluating the Skew of the $MZI_K$

As described above, the zero-order component (carrier component) of output light from an optical modulator contains the component $G_K$ from other MZIs. Thus, the strength of the side band component of n≠0 can be measured correctly without being affected by the bias state of MZIs other than the $MZI_K$. The strength of the zero-order component of an output signal can also be controlled by controlling the bias voltage applied to the $MZI_K$ and the single tone RF signal. $S_{n,K}=S_{-n,K}$ is obtained if the skew is ignored. Thus, an evaluation can be made regardless of whether a component of positive n or negative n is measured. Moreover, whether the skew is at a level at which the skew can be ignored can be estimated by checking whether $S_{n,K}=S_{-n,K}$ is satisfied for any bias state.

For example, the control apparatus receives an optical spectrum from a detector. Then, the control apparatus causes a computer to determine the received optical spectrum $S_{1,K}$ and $S_{-1,K}$. Then, the computer uses an operation unit to determine (an absolute value of) a difference or the ratio of $S_{1,K}$ and $S_{-1,K}$. Then, the computer compares a threshold stored in a storage unit and the determined absolute value of the difference or the determined ratio. If the determined absolute value of the difference or the determined ratio is equal to or less than the threshold, the computer determines that the skew is at a level that can be ignored. In this manner, the control unit can evaluate the skew level of the $MZI_K$.

Method of Evaluating the Extinction Ratio ($\eta_K$) of the $MZI_K$

As described above, $A_K$, $\alpha_{0,K}$, and $\eta_K$ can be determined by using the n-th order side band ($S_{n,K}^{(-)}$) of the $MZI_K$ at a bias voltage minimizing the odd-order or maximizing the even-order component of side bands and the n-th order side band ($S_{n,K}^{(+)}$) of the $MZI_K$ at a bias voltage maximizing the odd-order or minimizing the even-order component of side bands.

The maximum value or the minimum value of strength of side band components can be controlled by, as described above, the bias difference $B_K$ between both arms of the $MZI_K$. $B_K=0$ or $B_K=\pi$ can be achieved by controlling the bias voltage applied to the $MZI_K$. The state of $B_K=0$ or $B_K=\pi$ can also be obtained by adjusting the bias voltage while monitoring the optical spectrum.

The control unit that receives the optical spectrum from the detector causes, for example, the computer to determine $S_{1,K}^{(+)}$, $S_{1,K}^{(-)}$, $S_{2,K}^{(+)}$, $S_{2,K}^{(-)}$, $S_{3,K}^{(+)}$, and $S_{3,K}^{(-)}$. A program to solve a nonlinear simultaneous equation is already known. Thus, the computer has such a program stored in the main memory thereof. The computer can determine $A_K$, $\alpha_{0,K}$, and $\eta_K$ by performing a predetermined operation using the determined side band strength.

$A_K$ can be determined by Formula (25) using, for example, $S_{1,K}^{(+)}$ and $S_{2,K}^{(+)}$. This can be realized by implementing a program that determines $A_K$ from Formula (25) when $S_{1,K}^{(+)}$ and $S_{2,K}^{(+)}$ are input. The program may be such that a table is prepared in advance and $A_K$ is read in accordance with values of $S_{1,K}^{(+)}$ and $S_{2,K}^{(+)}$. Several solutions may be present as candidate values of $A_K$ and in such a case, a candidate may be selected by a method described later. Operation processing may be performed to make the value of $A_K$ more accurate by a method described later.

A method according to the present invention may evaluate measurement accuracy of $A_K$ and adopt $A_K$ only if the measurement accuracy is equal to or more than a predetermined level. According to the method, the first $A_K$ is determined by using the first order and second order side bands or the minus first order and minus second order side bands. Then, further the second $A_K$ is determined by using the third order side band or the minus third order side band. An example of the second $A_K$ is $A_K$ determined by the second order and third order side bands. Then, the measurement accuracy of $A_K$ is evaluated by determining whether the values of the first $A_K$ and the second $A_K$ are near.

For example, the computer determines the first $A_K$ from the first order and second order side bands by the same method as described above and stores the first $A_K$ in the storage unit. Next, the computer determines the second $A_K$ from the first order and third order side bands and stores the second $A_K$ in the storage unit. The storage unit also has a predetermined threshold stored therein. The computer reads the first $A_K$ and the second $A_K$ from the storage unit and causes the operation unit to perform operation processing to determine a difference or ratio. The computer reads the predetermined threshold from the storage unit. Then, the computer causes the operation unit to compare the absolute value of the difference or the ratio with the predetermined threshold. If the absolute value of the difference or the ratio is equal to or less than the predetermined threshold, the measurement accuracy of $A_K$ is equal to or more than a predetermined level and the computer outputs control instructions to that effect. On the other hand, if the measurement accuracy of $A_K$ is equal to or less than the predetermined level, for example, the computer issues instructions to retry the processing.

Further, $A_K$ and $\alpha_{0,K}$ can be determined by the computer implementing a program that performs an operation based on Formulas (32) and (33) or a program that performs an operation based on Formulas (34) and (35) by using $A_K$ determined as describes above, $S_{1,K}^{(+)}$, $S_{1,K}^{(-)}$, $S_{2,K}^{(+)}$, and $S_{2,K}^{(-)}$.

Further, the storage unit of the computer is caused to store $V_{OP}$ before the operation. Then, $V_{\pi,K}$ can be determined by the computer implementing a program that performs an operation based on Formula (39) using the determined $A_K$.

Evaluation of the Insertion Loss

An evaluation of the insertion loss can be made by using the intensity of input light and the strength of side bands. For example, the square root of the quotient obtained by dividing first order side band strength indicated by $S_{1,K}^{(+)}$ by input optical power becomes $K_K$. Thus, $K_K$ can be determined by using the intensity of input light and the strength of side bands. More specifically, a table to determine the square root may be prepared so that $K_K$ is determined from $S_{1,K}^{(+)}$ as input. For example, by making similar measurements of any MZI, an unbalance between MZIs can be determined. The optical loss of a whole modulator can be approximately given by $\Sigma_K K_K$ and thus, the optical loss of the whole modulator can be determined by determining $K_K$ for all MZIs and adding $K_K$.

Verification of an embodiment capable of determining $A_K$, $\alpha_{0,K}$, and $\eta_K$ with higher precision According to the present invention, two or more side bands of the first order or higher with the maximum peak power $S_{n,K}^+$ (or with the minimum peak power $S_{n,K}^-$) need to be measured to determine parameters of modulator characteristics to be measured. The first order side band peak $S_{1,K}^+$ is maximal for almost all $A_K$. Thus, if $S_{1,K}^+$ and the second largest second order side band peak $S_{1,K}^+$ or third order side band peak $S_{3,K}^+$ can be measured, $A_K$ can be determined.

However, if $A_K$ is set near $A_K=3.83$ with $J_1(A_K)=0$, $S_{1,K}^+$ becomes small and measurement accuracy decreases. If $A_K \ll 1$, both $S_{2,K}^+$ and $S_{3,K}^+$ become small and thus, measurement accuracy decreases. Thus, to evaluate characteristics with precision based on the present invention, it is preferable to adjust $A_K$. As shown in Formula (39), $A_K$ is related to the RF signal power ($V_{OP}$) and the half-wavelength voltage ($V_{\pi,K}$). Thus, it is preferable to grasp an approximate value of the half-wavelength voltage ($V_{\pi,K}$) before evaluating characteristics of the optical modulator. Because a modulator is used in combination with a driver, what V the half-wavelength voltage ($V_{\pi,K}$) is equal to or less than at a frequency can frequently be grasped. If the value of the half-wavelength voltage ($V_{\pi,K}$) is unknown, in which range the half-wavelength voltage ($V_{\pi,K}$) is can be determined based on power variations of some side band peaks when RF signal power is gradually increased from 0 V.

It is assumed here that $V_{\pi,K}$ can roughly be estimated and the range of $A_K$ is roughly known. Moreover, as common-sense conditions, a voltage manyfold $V_{\pi,K}$ is not applied to the modulator and the discussion is limited to the case when $A_K < 5.13$ ($J_2(A_K)=0$ point, about 3.2 times $V_{\pi,K}$). In this case, the equations (25) and (26) have each two solutions.

The method of determining $A_K$ in the above range of $A_K$ will be shown. The magnitude of $J_2(A_K)$ and $J_3(A_K)$ interchanges in the boundary of points where $J_1(A_K)=0$. That is, $J_2(A_K) > J_3(A_K)$ for $A_K > 3.83$ and $J_2(A_K) < J_3(A_K)$ for $A_K < 3.83$. From the above, the peak of the second order side band is large in the former case and the peak of the third order side band is large in the latter case.

Accordingly, if $A_K$ is set to some value and the second order side band peak is larger than the third order side band peak by measuring the optical spectrum in this case, the range of $A_K$ is limited to $0 < A_K < 3.83$ and $A_K$ can be determined by using Formula (25) from $S_{1,K}^+$ and $S_{2,K}^+$. If the third order side band peak is larger than the second order side band peak, the range of $A_K$ is limited to $3.83 < A_K < 5.13$ and $A_K$ can be determined by using Formula (26) from $S_{1,K}^+$ and $S_{3,K}^+$.

Next, in consideration of an actual system of measurement, the range of $A_K$ such that each side band peak can be measured is considered. Measurable power depends on performance of measuring instruments such as light source power, the measuring sensitivity range of an optical spectrum analyzer to be used, and dynamic range and performance of the modulator (the number of accumulated MZIs and insertion losses). $A_K$ allowing to measure $S_{1,K}^+$, and $S_{2,K}^+$ or $S_{3,K}^+$ will be investigated by assuming incident light power 0 dBm, the dynamic range of the optical spectrum analyzer 40 dB at intervals of 0.05 to 0.1 nm and 50 dB at intervals of 0.1 nm or more, and photosensitivity −80 dBm.

Limitation of Measuring Sensitivity

Incident power is equally divided to each MZI and in consideration of the excess loss of 5 dB, conditions for receiving each side band are given as:

$-5-10 \log K - 20 \log |J_{n,K}{}^+(A_K)| > -80$: incident power 0 dBm $10-5-10 \log K - 20 \log |J_{n,K}{}^+(A_K)| > -80$: incident power 10 dBm Limitation of the Dynamic Range A decreasing modulation frequency makes measurements of side bands more difficult. A wavelength interval $\Delta\lambda$ between side band peaks is expressed as $\Delta\lambda = \lambda^2 * \Delta f/c$ and thus, $\Delta\lambda$ becomes 0.08 nm for the wavelength 1.55 μm and 10 GHz modulation. Conversely, the interval of 0.05 nm means about 6 GHz and the interval of 0.1 nm means about 12 GHz. Here, two levels of 6 GHz to 12 GHz and 12 GH or more will be considered.

First, the ratio of zero-order power and first order power will be considered. It is assumed that bias voltages of all MZIs excluding the $MZI_K$ are set to 0 and output is maximal. Because the zero-order component becomes minimal when the first order component is maximal in the K-th MZI, the total of zero-order power can be approximated as $(K-1)/(K \cdot P_{in})$ and the first power can be approximated as $P_{in}/(K \cdot \{J_1(A_K)\}^2)$.

Thus, conditions are given as:

$-20 \log |J_{1,K}{}^+(A_K)| + 10 \log(K-1) < 40$:6 GHz to 12 GHz $-20 \log |J_{1,K}{}^+(A_K)| + 10 \log(K-1) < 50$:12 GHz or more.

Next, if the second order peak is used, the ratio of the zero-order peak and the second order peak will be considered.

When the second order peak is maximal with $P_{in}/(K \cdot \{J_2(A_K)\}^2)$, the zero-order peak becomes $P_{in}/(K \cdot [K-1+\{J_0(A_K)\}^2])$.

Therefore, conditions are given as $-20 \log |J_{2,K}{}^+(A_K)| + 10 \log [K-1+\{J_0(A_K)\}^2] < 50$.

If the third order peak is used, the ratio of the first order peak and the third order peak will be considered.

Conditions are given as $|\{20 \log |J_3(A_K)/J_1(A_K)|\}| < 50$.

That is, the preferred embodiment of the first aspect of the present invention includes, if the modulation index of the first arm of two arms of the $MZI_K$ is $A_{1,K}$, the chirp parameter of the $MZI_K$ is $\alpha_K{}^*$, $A_K$ is a value defined as $A_K = A_{1,K} + \alpha_K{}^*$, and is the Bessel function of the first kind, a process of determining $A_K$ by assuming that $A_K$ is smaller than a predetermined value of $A_K$ if $J_2(A_K) > J_3(A_K)$ and determining $A_K$ by assuming that $A_K$ is larger than the predetermined value of $A_K$ if $J_2(A_K) < J_3(A_K)$. An example of the predetermined value of $A_K$ is 3.83 as demonstrated in an example described later. On the other hand, there is no need to set the value of $A_K$ to exactly 3.83 and an example of the predetermined value of $A_K$ is a value of 2.5 to 5 inclusive, or 3 to 4.5 inclusive, or 3.5 to 4 inclusive.

The procedure for automatically using the principle by the control apparatus is described below. $J_2(A_K)$ and $J_3(A_K)$ are calculated during characteristics evaluation described above. Then, the computer stores $J_2(A_K)$ and $J_3(A_K)$ in the storage apparatus. Subsequently, the computer reads $J_2(A_K)$ and $J_3(A_K)$ stored in the storage apparatus to compare $J_2(A_K)$ and $J_3(A_K)$ in magnitude. A known method can be used to compare $J_2(A_K)$ and $J_3(A_K)$ in magnitude. For example, the computer may cause an operation apparatus to perform an operation of $J_2(A_K) - J_3(A_K)$ to determine the sign of a resultant value. The computer reads the predetermined value of $A_K$ stored in the storage apparatus. Then, the computer reads $A_K$ as solutions of the simultaneous equation described above. A plurality of $A_K$ is present. If $J_2(A_K) > J_3(A_K)$, the computer sets $A_K$ smaller than the predetermined value of $A_K$ as the solution of the simultaneous equation. On the other hand, if $J_2(A_K) < J_3 (A_K)$, the computer sets $A_K$ larger than the predetermined value of $A_K$ as the solution of the simultaneous equation. This work can also be done easily by comparing $A_K$ and the predetermined value of $A_K$. The computer that does the work can also be designed by implementing a program that causes the computer to function to perform the above process.

The preferred embodiment of the first aspect of the present invention includes, if the n-th order side band of the $MZI_K$ at a bias voltage maximizing the n-th order side band is $S_{n,K}{}^+$, the modulation index of the first arm of two arms of the $MZI_K$ is $A_{1,K}$, the chirp parameter of the $MZI_K$ is $\alpha_K{}^*$, and $A_K$ is a value defined as $A_K = A_{1,K} + \alpha_K{}^*$, a process of determining $A_K$ by assuming that $A_K$ is smaller than a predetermined value of $A_K$ if $S_{2,K}{}^+ > S_{3,K}{}^+$ and determining $A_K$ by assuming that $A_K$ is larger than the predetermined value of $A_K$ if $S_{2,K}{}^+ < S_{3,K}{}^+$.

An embodiment of comparing $J_2(A_K)$ and $J_3(A_K)$ in magnitude is described above. $J_2(A_K)$ and $J_3(A_K)$ are obtained in a process of evaluating characteristics. On the other hand, $J_2(A_K)$ and $J_3(A_K)$ are parameters related to $S_{2,K}{}^+$ and $S_{3,K}{}^+$ respectively. $S_{2,K}{}^+$ and $S_{3,K}{}^+$ can be determined quickly by using measured data. Thus, in the embodiment, $S_{2,K}{}^+$ and $S_{3,K}{}^+$ are compared in magnitude and based on the result, whether $A_K$ is smaller than the predetermined value of $A_K$ or larger than the predetermined value of $A_K$ is determined. An apparatus similar to one described above may suitably be adopted as an apparatus to achieve the operation.

The preferred embodiment of the first aspect of the present invention further includes a process of adjusting the strength of a radio frequency signal applied to the $MZI_K$ so that a difference between $S_{1,K}{}^+$ and the strength of the zero-order component of an output signal and a difference between $S_{2,K}{}^+$ and the strength of the zero-order component of the output signal are within the dynamic range of the system of measurement.

A radio frequency signal (RF signal) as a modulating signal is applied to the $MZI_K$. The frequency $f_m$ of the RF signal corresponds to a frequency difference between the carrier frequency $f_0$ and the modulating signal ($f_0 \pm f_m$). $A_K$ is a value dependent on the strength of the RF signal. $A_K$ is also an important parameter to evaluate characteristics of an optical modulator. In addition, as verified by an example described below, if a difference between $S_{1,K}{}^+$ and the strength of the zero-order component of an output signal and a difference between $S_{2,K}{}^+$ and the strength of the zero-order component of the output signal are within the dynamic range of the system of measurement, it is clear that $A_K$ can be determined with precision. Thus, it is clear that the characteristics evaluation of the present invention can be made with precision by adjusting the strength of a radio frequency signal applied to the $MZI_K$ so that a difference between $S_{1,K}{}^+$ and the strength of the zero-order component of an output signal and a difference between $S_{2,K}{}^+$ and the strength of the zero-order component of the output signal are within the dynamic range of the system of measurement.

The procedure for implementing the above processing is described below. The computer causes the storage apparatus to store the dynamic range of the system of measurement (such as a photo-detector). Then, the computer determines the strengths $S_{1,K}{}^+$ and $S_{2,K}{}^+$ of the zero-order component at a bias voltage to be $S_{1,K}{}^+$ and $S_{2,K}{}^+$ in the same manner as described above by adjusting the bias voltage applied to the $MZI_K$. Then, the computer causes the operation apparatus to determine a difference between $S_{1,K}{}^+$ and the strength of the zero-order component of an output signal and a difference between $S_{2,K}{}^+$ and the strength of the zero-order component of the output signal. The computer reads the dynamic range from the storage apparatus and causes the operation apparatus to determine whether the determined difference is within the dynamic range. If the operation apparatus analyzes that the determined difference is out of the dynamic range, the computer issues instructions to an RF signal source to change the strength of the RF signal. The computer repeats such an operation to adjust the strength of the radio frequency signal applied to the $MZI_K$ so that a difference between $S_{1,K}^+$ and the strength of the zero-order component of an output signal and a difference between $S_{2,K}^+$ and the strength of the zero-order component of the output signal are within the dynamic range of the system of measurement.

Figure 4:
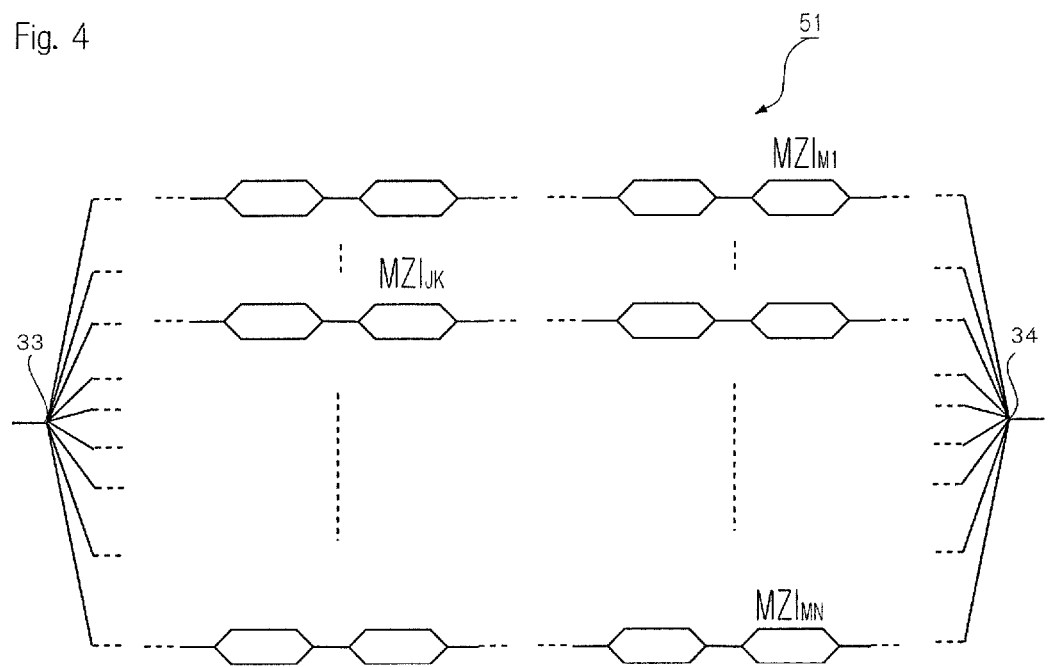
FIG. 4 is a diagram showing an example of the optical modulator containing matrix-type Mach-Zehnder interferometers (MZI).

FIG. 4 is a diagram showing an example of the optical modulator containing matrix-type Mach-Zehnder interferometers (MZI). More specifically, FIG. 4 relates to an optical modulator in which M×N Mach-Zehnder interferometers are placed in a matrix shape. The Mach-Zehnder interferometer to be evaluated is the $MZI_{J,K}$.

The M×N Mach-Zehnder interferometers are connected via the demultiplexing unit 33. Thus, light entering an input unit of a light signal is branched to the N MZIs ($MZI_{1,1}$ to $MZI_{1,N}$) via the demultiplexing unit 33. The light to each MZI is transmitted through both arms and multiplexed by a multiplexing unit before being output to the adjacent MZI.

The N MZIs ($MZI_{M,1}$ to $MZI_{M,N}$) are connected via the multiplexing unit 34. Thus, output lights from the N Mach-Zehnder interferometers are multiplexed by the multiplexing unit 34 and output from an output unit of the light signal.

Characteristics of the optical modulator as shown in FIG. 4 can be evaluated in the same manner as described above. When an evaluation is made, the MZIs connected serially are preferably in an ON state. Accordingly, output light intensity increases and precise measurement of side band components can be expected. Moreover, with other MZIs in an On state, excess losses of the serially connected MZIs and the whole waveguide can be calculated. Incidentally, there is no need to control the bias of MZIs belonging to other parallel portions.

If a single tone RF signal is applied to the $MZI_{JK}$, side bands are generated and, like the parallel Mach-Zehnder modulators, the odd-order side band component and the even-order side band component alternately take maximum and minimum values repeatedly in accordance with changes of the bias voltage. On the other hand, if the bias voltage of the MZIs ($MZI_{XK}$: X=1 to J−1, J+1 to M) placed serially with the $MZI_{JK}$ is changed, all side band components alternately take maximum and minimum values repeatedly while maintaining the ratio thereof constant. All the bias voltages of the serially connected MZIs are adjusted so that the strength of the whole side band components is maximized. At this point, all MZIs placed serially with the $MZI_{JK}$ are in an ON state. $A_{JK}$, $\alpha_{0,JK}$, and $\eta_{JK}$ can be determined according to a procedure similar to the procedure for the parallel Mach-Zehnder modulators by noting that $K_K$ represents the excess loss of the whole K-th parallel circuit by replacing K with JK regarding the $MZI_{QK}$ (Q≠K). When which power system controls which MZI can no longer be recognized in an optical modulator containing a plurality of MZIs, it is possible to grasp that MZIs placed serially with the $MZI_{JK}$ are controlled if the whole output strength varies.

On the other hand, if the bias voltage applied to MZIs ($MZI_{XY}$: X=1 to M, Y=1 to K−1, K+1 to N) positioned in parallel with the $MZI_{JK}$ is adjusted, the strength of the zero-order component of an output signal varies. Thus, measuring sensitivity can be improved by suppressing the zero-order component in the same manner as described above.

EXAMPLE 1

Signal Generator HP83650B manufactured by Agilent Technologies is used as a signal source, the RF frequency is set to 10 GHz, and setting values of signal strength are set to 0, 3, 6, 9, 12, 15, and 17.5 [dBm]. Light having a center wavelength at 1548.25 nm is used as a carrier signal. ML 2437A manufactured by Anritsu is used as a system of measurement.

The maximum value of odd-number orders and the minimum value of even-number orders are measured for the first order side bands by setting bias conditions for maximal peaks close to 0 V on the positive/negative sides. Average values of measured values are adopted as measured values. The maximum value of odd-number orders and the minimum value of even-number orders are adopted as those values under bias conditions under which plus first order side bands and minus first order side bands are at approximately the same level near an intermediate value of the two odd-number order maximum value bias conditions.

Figure 5:
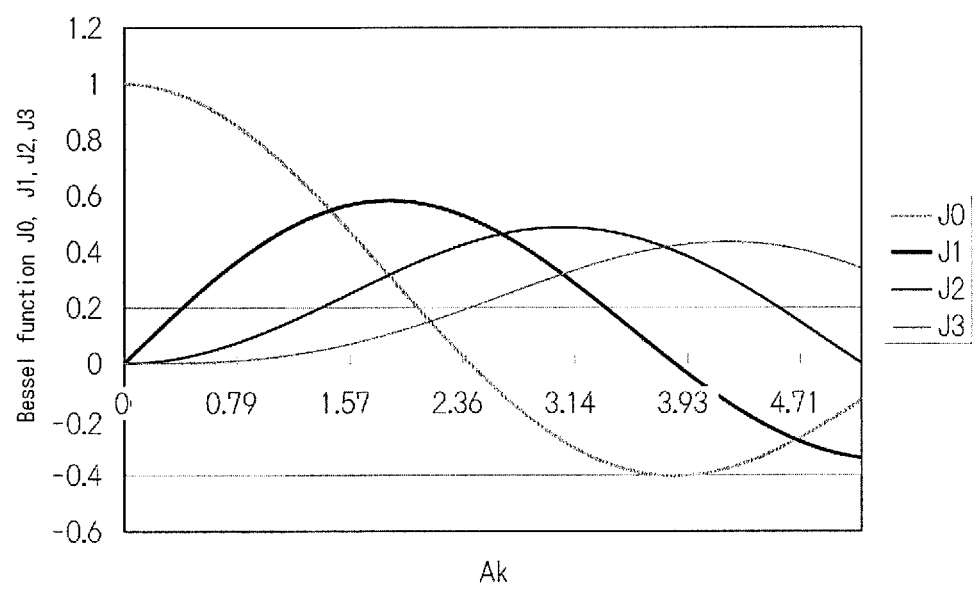
FIG. 5 is a graph (replacing a diagram) showing a relationship between $A_K$ and a Bessel function $J_n(A_K)$ (n=0 to 3) of the first kind.
Figures 6, 7:
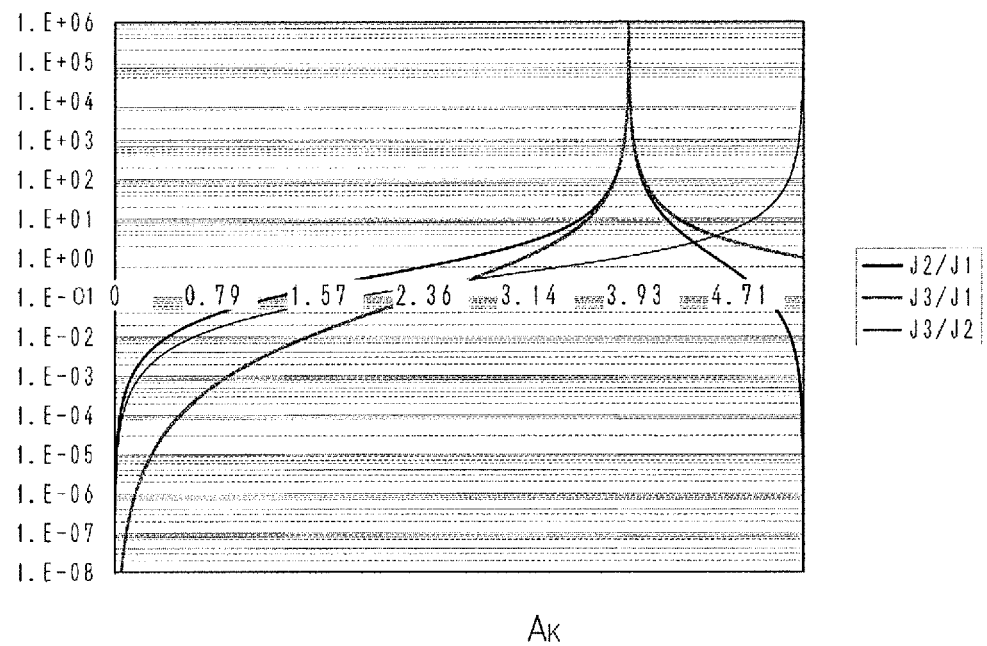
FIG. 6 is a graph (replacing a diagram) showing a ratio of the Bessel function $J_n(A_K)$ (n=1 to 3) of the first kind.
FIG. 7 shows characteristics of a modulator evaluated by changing power of an RF signal to several levels.

Investigation of the setting range of $A_K$ in which $A_K$ can be determined precisely shows that the range is determined mainly by the dynamic range as a limiting factor while the limitation based on sensitivity is loose. In this case, the setting range of $A_K$ when k=4 is roughly determined (by setting the dynamic range to 40 dB). FIG. 5 is a graph (replacing a diagram) showing a relationship between $A_K$ and the Bessel function $J_n(A_K)$ (n=0 to 3) of the first kind. FIG. 6 is a graph (replacing a diagram) showing a ratio of the Bessel function $J_n(A_K)$ (n=1 to 3) of the first kind. It is clear from FIGS. 5 and 6 that the preferred setting range of $A_K$ is 0.23 to 3.78 and 3.88 to 5.13. The lower end of the former case shows that the difference between the second order side bands and zero-order side bands is within the dynamic range and the upper end of the former case shows that the difference between the first order side bands and zero-order side bands is within the dynamic range. The lower end of the latter case is determined by the difference between the first order side bands and zero-order side bands. Therefore, it is important that respective power differences fall within the dynamic range.

Actual measurements are made by using a modulator of k=4. FIG. 7 shows characteristics ($V_{\pi,K}$) of a modulator evaluated by changing power of an RF signal to several levels. It is clear from FIG. 7 that if RF power is low, the difference between the second order side band peak and the zero-order side band peak is slightly deviated from the dynamic range and thus, the value of $V_{\pi,K}$ is measured slightly lower than other measured values.

INDUSTRIAL APPLICABILITY

The present invention can suitably be used in the field of optical information communication.

What is claimed is:

1. A method for evaluating characteristics of an optical modulator containing a plurality of Mach-Zehnder interferometers (MZIs),
   wherein the optical modulator includes N (N is an integer 2 or more) MZIs connected in parallel,
   the MZI to be evaluated is a K-th MZI ($MZI_K$) and the strength of a n-th order side band component of the $MZI_K$ is defined to be $S_{n,k}$,
   the method comprising:
   measuring output strength; and
   evaluating characteristics of the MZI, wherein
   the measuring output strength comprises determining the ($S_{n,k}$),
   the evaluating characteristics of the MZI further comprises:
   controlling a bias voltage applied to electrodes of the $MZI_K$;

measuring the n-th order side band of the $MZI_K$ at a bias voltage minimizing the odd-order or maximizing the even-order component of side bands to obtain a first strength of the n-th order side band, and the n-th order side band of the $MZI_K$ at a bias voltage maximizing the odd-order or minimizing the even-order component of side bands to obtain a second strength of the n-th order side band, and determining characteristics of the MZI of the $MZI_K$ by using the first strength and the second strength of the n-th order side band.

2. A method in accordance with claim 1, further comprising:

adjusting a bias voltage applied to the MZIs other than the $MZI_K$ of the plurality of MZIs; and, suppressing a zero-order component contained in output light from the optical modulator.

3. A method in accordance with claim 1, wherein the determining characteristics of the MZI of the $MZI_K$ comprises determining an extinction ratio ($\eta_K$) of the $MZI_K$ by using the first strength and the second strength of the n-th order side band.

4. A method in accordance with claim 1, wherein the determining characteristics of the MZI of the $MZI_K$ comprises determining a chirp parameter ($\alpha_K^*$) of the $MZI_K$ by using the first strength and the second strength of the n-th order side band.

5. A method in accordance with claim 1, further comprising:

determining a half-wavelength voltage ($V_{\pi,K}$) of the $MZI_K$ by using the first strength and the second strength of the n-th order side band.

6. A method in accordance with claim 1, wherein the evaluating characteristics of the MZI further comprises:

determining $A_K$ of the $MZI_K$ by using the first strength and the second strength of the n-th order side band, determining the first $A_K$ by using the first order and second order side band or the -first order and second order side band;

determining the second $A_K$ by using the third order or -third order side band; and, evaluating the measurement accuracy of $A_K$ by determining whether values of the first $A_K$ and the second $A_K$ are close, wherein a modulation index of a first arm of two arms of the $MZI_K$ is $A_{1,K}$, a chirp parameter of the $MZI_K$ is $\alpha_K^*$, and $A_K = A_{1,K} + \alpha_K^*$.

7. A method in accordance with claim 1, and, wherein the determining characteristics of the MZI of the $MZI_K$ comprises determining an insertion loss ($K_K$) of the $MZI_K$ by using the first strength and the second strength of the n-th order side band.

8. A method for evaluating characteristics of an optical modulator containing a plurality of Mach-Zehnder interferometers (MZIs), wherein the optical modulator includes N (N is an integer 2 or more) MZIs connected in parallel, the MZI to be evaluated is a K-th MZI ($MZI_K$) and a strength of a n-th order side band component of the $MZI_K$ is defined to be $S_{n,k}$, the method comprising:

measuring output strength; and evaluating characteristics of the MZI, wherein the measuring output strength comprises determining the strength ($S_{n,k}$) of a side band signal contained in output light from the optical modulator, the measuring output strength further comprises determining $S_{-n,k}$, which is defined to be a strength of a -n-th order side band component of the $MZI_K$, the evaluating characteristics of the MZI comprises calculating whether a difference or a ratio of $S_{n,k}$ and $S_{-n,k}$ is a predetermined threshold or less, thereby evaluating a skew of the $MZI_K$.

9. A method for evaluating characteristics of an optical modulator containing a plurality of Mach-Zehnder interferometers (MZIs), wherein the optical modulator includes N (N is an integer 2 or more) MZIs connected in parallel, the MZI to be evaluated is a K-th MZI ($MZI_K$) and the strength of a n-th order side band component of the $MZI_K$ is defined to be $S_{n,k}$, the method comprising:

measuring output strength; and evaluating characteristics of the MZI, wherein the measuring output strength comprises determining the $S_{n,k}$, the evaluating characteristics comprises evaluating characteristics of the $MZI_K$ by using $S_{n,k}$ a modulation index of a first arm of two arms of the $MZI_K$ is $A_{1,K}$, a chirp parameter of the $MZI_K$ is $\alpha_K^*$, $A_K = A_{1,K} + \alpha_K^*$, and $J_n$ is defined to be a Bessel function of a first kind, the evaluating characteristics of the MZI further comprises:

determining $A_K$ by assuming that $A_K$ is smaller than a predetermined value of $A_K$ if $J_2(A_K) > J_3(A_K)$; and determining $A_K$ by assuming that $A_K$ is larger than the predetermined value of $A_K$ if $J_2(A_K) < J_3(A_K)$.

10. A method for evaluating characteristics of an optical modulator containing a plurality of Mach-Zehnder interferometers (MZIs), wherein the optical modulator includes N (N is an integer 2 or more) MZIs connected in parallel, the MZI to be evaluated is a K-th MZI ($MZI_K$) and a strength of a n-th order side band component of the $MZI_K$ is defined to be $S_{n,k}$, the method comprising:

measuring output strength; and evaluating characteristics of the MZI, wherein the measuring output strength comprises determining the $S_{n,k}$, the n-th order side band of the $MZI_K$ at a bias voltage maximizing the n-th order side band is $S_{n,K}^+$, a modulation index of the first arm of two arms of the $MZI_K$ is $A_{1,K}$, a chirp parameter of the $MZI_K$ is $\alpha_k^*$, and $A_K = A_{1,K} + \alpha_K^*$, the evaluating characteristics of the MZI comprises:

determining $A_K$ by assuming that $A_K$ is smaller than a predetermined value of $A_K$ if $S_{2,K}^+ > S_{3,K}^+$; and determining $A_K$ by assuming that $A_K$ is larger than the predetermined value of $A_K$ if $S_{2,K}^+ < S_{3,K}^+$.

* * * * *